United States Patent
Harakawa et al.

(10) Patent No.: US 7,034,066 B2
(45) Date of Patent: Apr. 25, 2006

(54) WATER-BORNE BASE COATING COMPOSITION FOR AUTOMOBILES

(75) Inventors: Tsuyoshi Harakawa, Anjo (JP); Hideaki Ogawa, Sakai (JP); Shigeyuki Sasaki, Nara (JP); Takashi Nakano, Kyoto (JP); Hirofumi Oi, Kyoto (JP)

(73) Assignees: Nippon Paint Co., Ltd., Osaka (JP); San Nopco Limited, Kyoto (JP)

( * ) Notice: Subject to any disclaimer, the term of this patent is extended or adjusted under 35 U.S.C. 154(b) by 85 days.

(21) Appl. No.: 10/364,594

(22) Filed: Feb. 11, 2003

(65) Prior Publication Data
US 2003/0175435 A1  Sep. 18, 2003

(30) Foreign Application Priority Data
Feb. 12, 2002 (JP) .............................. 2002-034552

(51) Int. Cl.
*C09D 5/02* (2006.01)
*C08K 3/22* (2006.01)

(52) U.S. Cl. ..................... 523/171; 524/430; 524/449; 524/839

(58) Field of Classification Search ................ 523/171; 524/430, 449, 839
See application file for complete search history.

(56) References Cited

U.S. PATENT DOCUMENTS 3,862,071 A   1/1975   Di Carlo 5,840,372 A  * 11/1998  Rink et al. ............... 427/407.1

FOREIGN PATENT DOCUMENTS

| EP | 1 241 237 | 9/2002 |
|---|---|---|
| GB | 987404 | 3/1965 |
| JP | 7-53913 | 2/1995 |
| WO | 91/09685 | 7/1991 |
| WO | 93/23443 | 11/1993 |
| WO | 97/23307 | 7/1997 |
| WO | 99/06450 | 2/1999 |

* cited by examiner

*Primary Examiner*—Tae H. Yoon
(74) *Attorney, Agent, or Firm*—Jordan and Hamburg LLP

(57) ABSTRACT

A water-borne base coating composition for automobiles which can give a coating film excellent in luster and in coloration comprises an emulsion resin obtained by emulsion polymerization of an α,β-ethylenically unsaturated monomer mixture having an acid value of 3 to 50 and comprising at least 65% by mass of a (meth)acrylate ester whose ester moiety contains one or two carbon atoms, a coloring component comprising an optically coherent flaky pigment, and an acrylic polymer compound having a weight average molecular weight of 400,000 to 1,500,000 and represented by the general formula (1):

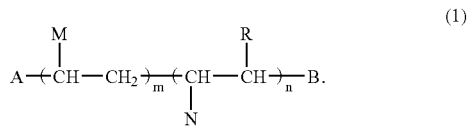

(1)

3 Claims, No Drawings

WATER-BORNE BASE COATING COMPOSITION FOR AUTOMOBILES

FIELD OF THE INVENTION

This invention relates to a water-borne base coating composition to be applied to automotive bodies or the like. More particularly, it relates to a water-borne base coating composition capable of giving a coating film excellent in luster and in coloration.

BACKGROUND OF THE INVENTION

The coatings so far in industrial use are the so-called solvent-borne coatings in which an organic solvent is used as a diluent solvent. Thus, the coatings contain a large amount of an organic solvent. However, in view of the recent concern about the environment, water-borne coatings in which the organic solvent content is reduced and water is used as a diluent solvent have been developed or under development.

Thus, in Japanese Kokai Publication Hei-07-53913, for instance, there is disclosed, as such a water-borne coating, a water-borne coating composition which comprises a resin obtained by at least partly neutralizing a polymer composed of an amide group-containing ethylenically unsaturated monomer, an acidic group-containing ethylenically unsaturated monomer and a hydroxyl group-containing ethylenically unsaturated monomer, and an aqueous dispersion of a carboxyl group-containing acrylic resin particles.

There is a problem, however, that compared with the earlier solvent-borne coatings, the coating film obtained from the so-far known water-borne coatings are generally poor in luster and coloration.

Accordingly, it is an object of the present invention to provide a water-borne base coating composition for automobiles which can give a coating film excellent in luster and in coloration.

SUMMARY OF THE INVENTION

The invention provides a water-borne base coating composition for automobiles comprising an emulsion resin obtained by emulsion polymerization of an α,β-ethylenically unsaturated monomer mixture having an acid value of 3 to 50 and comprising at least 65% by mass of a (meth)acrylate ester whose ester moiety contains one or two carbon atoms, a coloring component comprising an optically coherent flaky pigment, and an acrylic polymer compound having a weight average molecular weight of 400,000 to 1,500,000 and represented by the general formula (1):

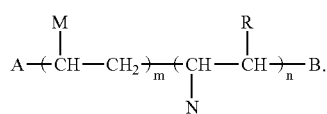

(1)

in the formula, A and B are the same or different and each represents a molecular terminal group resulting from radical polymerization, a terminal group resulting from hydrolysis thereof, a hydrogen atom or a hydroxyl group; M represents a carboxylic acid group or a carboxylic acid group neutralized with ammonia or a primary, secondary or tertiary amine compound, N represents a carboxylic acid group, a carboxylic acid ester group whose ester moiety contains one or more carbon atoms, or a carboxylic acid group neutralized with ammonia or a primary, secondary or tertiary amine compound; m is an integer of not less than 1 and n is an integer of not less than 0, provided that m/9 is not less than n; and R is a hydrogen atom or a methyl group, the content of said acrylic polymer compound on the solid basis being 0.3 to 4.0% by mass relative to the resin solids in the coating composition.

Said water-borne base coating composition for automobiles preferably comprises a polyether polyol having, on an average, not less than 0.02 primary hydroxyl group per molecule, and having a number average molecular weight of 300 to 3,000 and a water tolerance value of not less than 2.0.

Said polyether polyol preferably has not less than one primary hydroxyl group per molecule and a hydroxyl value of 30 to 700.

The present invention relates to a method of forming a multilayer coating film which comprises applying a water-borne base coating composition to an article to be coated and applying a clear coating composition thereon, followed by curing by heating, said water-borne base coating composition being the water-borne base coating composition for automobiles.

The present invention relates to a coated article having a coating film formed by the method of forming a multilayer coating film mentioned above.

DETAILED DESCRIPTION OF THE INVENTION

Water-borne Base Coating Composition for Automobiles

The emulsion resin contained in the water-borne base coating composition of the invention is one obtained by emulsion polymerization of an α,β-ethylenically unsaturated monomer mixture having an acid value of 3 to 50 and comprising at least 65% by mass of a (meth)acrylate ester whose ester moiety contains one or two carbon atoms. When the content of the (meth)acrylate ester whose ester moiety contains one or two carbon atoms as contained in the α,β-ethylenically unsaturated monomer mixture is less than 65% by mass, the multilayer coating film obtained will be poor in appearance. The (meth)acrylate ester whose ester moiety contains one or two carbon atoms includes, within the meaning thereof, methyl (meth)acrylate and ethyl (meth)acrylate. The term "(meth)acrylate ester" includes both an acrylate ester and an methacrylate ester.

The above α,β-ethylenically unsaturated monomer mixture has an acid value of 3 to 50, preferably 7 to 40. When the acid value is less than 3, the workability in coating becomes unsatisfactory. When it exceeds 50, the performance characteristics of the coating film obtained will deteriorate.

The above α,β-ethylenically unsaturated monomer mixture comprises an acid group-containing α,β-ethylenically unsaturated monomer(s). As the acid group-containing α,β-ethylenically unsaturated monomer, there may specifically be mentioned acrylic acid, methacrylic acid, acrylic acid dimer, crotonic acid, 2-acryloyloxyethylphtalic acid, 2-acryloyloxyethylsuccinic acid, 2-acryloyloxyethyl acid phosphate, 2-acrylamido-2-methylpropanesulfonic acid, ω-carboxy-polycaprolactone mono(meth)acrylate, isocrotonic acid, α-hydro-ω-[(1-oxo-2-propenyl)oxy]poly[oxy(1-oxo-1,6-hexanediyl)], maleic acid, fumaric acid, itaconic acid, 3-vinylsalicylic acid, 3-vinylacetylsalicylic acid, and like ones having an acid group(s), such as a carboxyl, sulfonic or phosphoric acid group. Preferred among these are acrylic acid, methacrylic acid, and acrylic acid dimer.

The above α,β-ethylenically unsaturated monomer mixture preferably is a hydroxyl group-containing one. The hydroxyl value is preferably 10 to 150, more preferably 20 to 100. When the hydroxyl value is less than 10, no improvement in curability may possibly be attained. When it exceeds 150, the performance characteristics of the coating film obtained may possibly be poor.

In cases where the α,β-ethylenically unsaturated monomer mixture is a hydroxyl group-containing one, the α,β-ethylenically unsaturated monomer mixture comprises a hydroxyl group-containing α,β-ethylenically unsaturated monomer.

The hydroxyl group-containing α,β-ethylenically unsaturated monomer includes hydroxyethyl (meth)acrylate, hydroxypropyl (meth)acrylate, hydroxybutyl (meth)acrylate, allyl alcohol and hydroxyethyl (meth)acrylate-ϵ-caprolactone adducts. Preferred among them are hydroxyethyl (meth)acrylate, hydroxybutyl (meth)acrylate, and hydroxyethyl (meth)acrylate-ϵ-caprolactone adducts.

The above α,β-ethylenically unsaturated monomer mixture may further contain one or more of other α,β-ethylenically unsaturated monomers, for example (meth)acrylate esters whose ester moiety contains 3 or more carbon atoms (e.g. n-butyl (meth)acrylate, isobutyl (meth)acrylate, tert-butyl (meth)acrylate, 2-ethylhexyl (meth)acrylate, lauryl (meth)acrylate, phenyl (meth)acrylate, isobornyl (meth)acrylate, cyclohexyl meth(acrylate), tert-butylcyclohexyl (meth)acrylate, dicyclopentadienyl (meth)acrylate, dihydrodicyclopentadienyl (meth)acrylate, etc.), polymerizable amide compounds (e.g. (meth)acrylamide, N-methylol (meth)acrylamide, N,N-dimethyl(meth)acrylamide, N,N-dibutyl(meth)acrylamide, N,N-dioctyl(meth)acrylamide, N-monobutyl(meth)acrylamide, N-monooctyl(meth)acrylamide, 2,4-dihydroxy-4'-vinylbenzophenone, N-(2-hydroxyethyl)acrylamide, N-(2-hydroxyethyl)methacrylamide, etc.), polymerizable aromatic compounds (e.g. styrene, α-methylstyrene, phenyl vinyl ketone, tert-butylstyrene, parachlorostyrene, vinylnaphthalene, etc.), polymerizable nitriles (e.g. acrylonitrile, methacrylonitrile, etc.), α-olefins (e.g. ethylene, propylene, etc.), vinyl esters (e.g. vinyl acetate, vinyl propionate, etc.), and dienes (e.g. butadiene, isoprene, etc.). One or more appropriate ones may be selected from among these according to the intended purpose of use thereof. For the purpose of providing hydrophilicity with ease, (meth)acrylamide is preferably used.

It is necessary, however, that the content, in the α,β-ethylenically unsaturated monomer mixture, of the above-mentioned α,β-ethylenically unsaturated monomer(s) other than the (meth)acrylate ester whose ester moiety contains one or two carbon atoms should be selected at a level lower than 35% by mass.

The glass transition temperature (Tg) of the above-mentioned emulsion resin is preferably within the range of −20° C. to 80° C. from the viewpoint of physical properties of the coating film obtained.

The above-mentioned acid value, hydroxyl value and Tg can be determined either by actual measurements of the emulsion resin or by calculation based on the contents of the respective α,β-ethylenically unsaturated monomers in the α,β-ethylenically unsaturated monomer mixture. The acid value, hydroxyl value and Tg data given herein are all values calculated based on the contents of the respective α,β-ethylenically unsaturated monomers in the α,β-ethylenically unsaturated monomer mixture.

The above-mentioned emulsion resin is a resin obtained by emulsion polymerization of the above α,β-ethylenically unsaturated monomer mixture. The emulsion polymerization can be carried out using any of the conventional methods generally known in the art. Specifically, the emulsion polymerization can be carried out by dissolving an emulsifier in water or, if necessary, in an aqueous medium containing an organic solvent such as an alcohol, and adding dropwise the α,β-ethylenically unsaturated monomer mixture and a polymerization initiator with heating and stirring. The α,β-ethylenically unsaturated monomer mixture may be added dropwise in the form of an emulsion prepared in advance using an emulsifier and water.

Preferred, among others, as the polymerization initiator are oil-soluble azo compounds (e.g. azobisisobutyronitrile, 2,2'-azobis(2-methylbutyronitrile), 2,2'-azobis(2,4-dimethylvaleronitrile), etc.) and water-soluble azo compounds (e.g. anionic 4,4'-azobis(4-cyanovaleric acid) and cationic 2,2'-azobis(2-methylpropionamidine)); as well as oil-soluble peroxides (e.g. benzoyl peroxide, parachlorobenzoyl peroxide, lauroyl peroxide, tert-butyl perbenzoate, etc.) and water-soluble peroxides (e.g. potassium persulfate, ammonium peroxide, etc.) in redox systems.

The above-mentioned emulsifier may be any of those well known to those skilled in the art. In particular, reactive emulsifiers, such as Antox MS-60 (trademark, product of Nippon Nyukazai), Eleminol JS-2 (trademark, product of Sanyo Chemical Industries), Adeka Reasoap NE-20 (trademark, product of Asahi Denka Kogyo), Aqualon HS-10 (trademark, product of Dai-ichi Kogyo Seiyaku) and the like, are preferred.

Where necessary, a chain transfer agent, such as a mercaptan like laurylmercaptan or α-methylstyrene dimer, may be used for molecular weight adjustment.

The reaction temperature depends on the polymerization initiator, and the polymerization is preferably carried out, for example, at 60 to 90° C. with azo initiators or 30 to 70° C. with redox system initiators. The reaction time is generally 1 to 8 hours. The content of the polymerization initiator relative to the whole amount of the α,β-ethylenically unsaturated monomer mixture is generally 0.1 to 5% by mass, preferably 0.2 to 2% by mass.

The above emulsion polymerization can be carried out in two steps. Namely, a portion of the α,β-ethylenically unsaturated monomer mixture (hereinafter, "α,β-ethylenically unsaturated monomer mixture 1") is first subjected to emulsion polymerization, the remaining portion of the α,β-ethylenically unsaturated monomer mixture (hereinafter, "α,β-ethylenically unsaturated monomer mixture 2") is then added thereto, and the emulsion polymerization is further carried out. The composition of the α,β-ethylenically unsaturated monomer mixture 1 and that of the α,β-ethylenically unsaturated monomer mixture 2 may be the same or different.

For forming a multilayer coating film having an excellent appearance, it is preferred that the α,β-ethylenically unsaturated monomer mixture 1 contain an amide group-containing α,β-ethylenically unsaturated monomer. On that occasion, it is more preferred that the α,β-ethylenically unsaturated monomer mixture 2 be free of any amide group-containing α,β-ethylenically unsaturated monomer. Since the α,β-ethylenically unsaturated monomer mixture 1 and α,β-ethylenically unsaturated monomer mixture 2 combinedly constitute the above-mentioned α,β-ethylenically unsaturated monomer mixture, the above-mentioned requirements imposed on the α,β-ethylenically unsaturated monomer mixture should be satisfied by the sum total of the α,β-ethylenically unsaturated monomer mixture 1 and α,β-ethylenically unsaturated monomer mixture 2.

The thus-obtained emulsion resin preferably has a mean particle diameter within the range of 0.01 to 1.0 μm. When the mean particle diameter is less than 0.01 μm, the workability in the step of application will be improved only to a lesser extent. When it exceeds 1.0 μm, the coating film obtained may possibly show a deteriorated appearance. This mean particle diameter can be adjusted by controlling the monomer composition and/or emulsion polymerization conditions.

The above emulsion resin can be used at pH 5 to 10, if necessary by neutralizing with a base. This owes to the fact that the resin is highly stable in this pH range. This neutralization is preferably carried out by adding a tertiary amine, such as dimethylethanolamine or triethylamine, to the system before or after emulsion polymerization.

The content of the above emulsion resin in the water-borne base coating composition for automobiles according to the present invention is preferably 5 to 95% by mass, more preferably 10–85% by mass, still more preferably 20 to 70% by mass, based on the coating solids. When the above content is outside the above range, the workability in the step of application and/or the appearance of the coating film obtained may possible become deteriorated.

The acrylic polymer compound to be contained in the water-borne base coating composition for automobiles according to the invention is represented by the general formula (1):

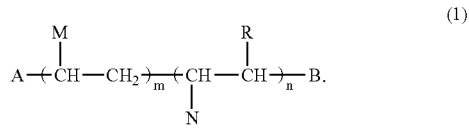

in the formula, A and B are the same or different and each represents a molecular terminal group resulting from radical polymerization, a terminal group resulting from hydrolysis thereof, a hydrogen atom or a hydroxyl group; M represents a carboxylic acid group or a carboxylic acid group neutralized with ammonia or a primary, secondary or tertiary amine compound, N represents a carboxylic acid group, a carboxylic acid ester group whose ester moiety contains one or more carbon atoms, or a carboxylic acid group neutralized with ammonia or a primary, secondary or tertiary amine compound; m is an integer of not less than 1 and n is an integer of not less than 0, provided that m/9 is not less than n; and R is a hydrogen atom or a methyl group. When m/9 is smaller than n, the coating film obtained will be unsatisfactory in luster and in coloration. Preferably, m/19 is not less than n. In cases where N is a carboxylic acid ester group, the ester moiety thereof preferably contains one or two carbon atoms from the viewpoint of the luster and coloration of the coating film obtained.

The above-mentioned acrylic polymer compound has a weight average molecular weight of 400,000 to 1,500,000. When this is less than 400,000, the water resistance of the coating film obtained may possibly become low. When it exceeds 1,500,000, the compatibility with other components may possibly become low. Thus, it is preferably 500,000 to 1,200,000. The weight average molecular weight can be determined by GPC (gel permeation chromatography) on the polyethylene glycol standard basis.

The acrylic polymer compound is obtained by polymerizing a monomer mixture comprising acrylic acid or a salt resulting from neutralization of acrylic acid with a base. As other components contained in the monomer mixture, there may be mentioned, for example, methacrylic acid, salts resulting from neutralization of methacrylic acid, and (meth)acrylic acid ester monomers such as methyl (meth)acrylate, ethyl (meth)acrylate and n-butyl (meth)acrylate.

The method of polymerization is not particularly restricted but may include solution polymerization in water or in an aqueous medium containing an organic solvent such as an alcohol as necessary, or such emulsion polymerization using an emulsifier, a polymerization initiator, a chain transfer agent, etc. as mentioned hereinabove referring to the emulsion resin.

In cases where M and/or N in the above general formula (1) is a neutralized carboxyl acid group, the acrylic acid monomer may be neutralized prior to the above polymerization, followed by subjecting the neutralized salt to the above polymerization or, alternatively, the acrylic polymer compound obtained by the above polymerization may be neutralized to give a neutralized salt. The neutralization is carried out using, for example, ammonia or a primary, secondary or tertiary amine compound. The amine compound may be an alkanolamine or a lower ($C_1$–$C_4$) alkylamine.

The content of the acrylic polymer compound represented by the general formula (1) in the water-borne base coating composition of the present invention is 0.3 to 4.0% by mass on the solid basis relative to the resin solid content in the coating composition. When it is less than 0.3% by mass, the luster and coloration of the coating film obtained are improved only to an unsatisfactory extent. When it exceeds 4.0% by mass, the coating viscosity will decrease, hence the workability in the step of application may possibly decrease. Preferably, it is 0.5 to 2.0% by mass.

The coloring component contained in the water-borne base coating composition for automobiles according to the invention comprises an optically coherent flaky pigment. Such optically coherent flaky pigment is not particularly restricted in its shape. It may be colored. Preferably, however, it is a scaly one having a mean particle diameter (D50) of 2 to 50 μm and a thickness of 0.1 to 5 μm. One having a mean particle diameter within the range of 10 to 30 μm is excellent in luster, hence is more preferred. As specific examples, there may be mentioned aluminum oxide, coherent mica pigments, and white mica pigments, among others.

As the other coloring components than the above optically coherent flaky pigment, there may be mentioned, among others, organic pigments, such as azo chelate pigments, insoluble azo pigments, condensed azo pigments, phthalocyanine pigments, indigo pigments, perinone pigments, perylene pigments, dioxane pigments, quinacridone pigments, isoindolinone pigments, and metal complex pigments, inorganic pigments such as chrome yellow, yellow iron oxide, red iron oxide, carbon black, and titanium dioxide, and non-coherent metallic pigments such as aluminum, copper, zinc, iron, nickel, tin and like metals or alloys thereof.

The concentration of the above coloring component in the water-borne base coating composition for automobiles according to the invention is preferably 0.1 to 50% by mass, more preferably 0.5 to 40% by mass, still more preferably 1.0 to 30% by mass. When it is less than 0.1% by mass, no satisfactory coloring effects will be obtained. When it exceeds 50% by mass, the appearance of the coating film obtained may possibly become deteriorated. The concentration of the above-mentioned optically coherent flaky pigment, among others, is generally not more than 18.0% by mass, preferably 0.01 to 15.0% by mass, more preferably 0.01 to 13.0% by mass.

The concentrations of the coloring component and optically coherent flaky pigment are calculated according to the formulas [mass of coloring component/(mass of coloring component+mass of coating resin solids)]×100 and [mass of optically coherent flaky pigment/(mass of coloring component+mass of coating resin solids)]×100, respectively.

In cases where the composition contains a scaly one as the optically coherent flaky pigment, it is preferred that the composition further contain a phosphoric acid group-containing acrylic resin. This phosphoric acid group-containing acrylic resin is an acrylic resin obtained by copolymerizing a monomer represented by the general formula (2):

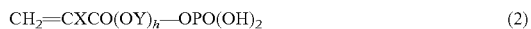

$$CH_2=CXCO(OY)_h-OPO(OH)_2 \qquad (2)$$

with another or other ethylenic monomers. In the above formula, X represents a hydrogen atom or a methyl group, Y represents an alkylene group containing 2 to 4 carbon atoms, and h represents an integer of 3 to 30. The phosphoric acid group-containing acrylic resin is used for successfully dispersing the scaly optically coherent flaky pigment. The phosphoric acid group-containing acrylic resin preferably has a number average molecular weight of 1,000 to 50,000. When the number average molecular weight is less than 1,000, the dispersion of the scaly, optically coherent flake pigment may become insufficient in some instances and, when the number average molecular weight exceeds 50,000, the appearance of the coating film obtained may possibly become deteriorated.

The above phosphoric acid group-containing acrylic resin preferably has a solid matter acid value of 15 to 200 and, furthermore, the phosphoric acid group-due acid value among said acid value is preferably 10 to 150. When the acid value is less than 15, the scaly, optically coherent flake pigment cannot be dispersed to a satisfactory extent in certain cases. When the acid value exceeds 200, the storage stability of the water-borne base coating composition may possibly decrease.

Furthermore, the phosphoric acid group-containing acrylic resin may have a hydroxyl value for curability securing, and the value is preferably 20 to 200. The content of the phosphoric acid group-containing acrylic resin is preferably 0.01 to 5 parts by mass, more preferably 0.1 to 4 parts by mass, most preferably 0.2 to 3 parts by mass, per 100 parts by mass of the coating resin solids. When the content of the phosphoric acid group-containing acrylic resin is too low, the performance characteristics of the coating film may become deteriorated. When the content of the phosphoric acid group-containing acrylic resin is excessive, the storage stability of the coating becomes poor. Specific examples of the monomer represented by the above general formula (2) are acid phosphoxyhexa(oxypropylene) monomethacrylate, and acid phosphoxydodeca(oxypropylene) monomethacrylate. The other ethylenic monomer mentioned above is an ethylenic monomer copolymerizable with the monomer represented by the general formula (2). It may be a monomer mixture composed of a plurality of such monomers.

In cases where the water-borne base coating composition for automobiles of the invention contains a metal-made optically coherent flaky pigment or a metal-made pigment, it is preferred that the composition further comprise an alkyl group-containing phosphoric ester compound as a corrosion inhibitor of such pigment or for improving the wettability thereof and improving the physical properties of the multilayer coating film obtained. The alkyl group preferably contains 8 to 18 carbon atoms, more preferably 10 to 14 carbon atoms. When the number of carbon atoms is less than 8, the wettability decreases, hence the adhesion decreases. When it exceeds 18, the compound may crystallize out in the coating, thus possibly causing troubles.

Preferably, the above compound has an HLB value within the range of 3 to 12, more preferably 4 to 8. When the HLB is outside the above range, the wettability may possibly decrease. HLB values can be calculated according to Griffin's formula base on mass fraction: $HLB=20\times(MH/M)$ [where MH is the molecular weight of the hydrophilic moiety, and M means the molecular weight of the surfactant]. The molecular weight of the hydrophilic moiety can be determined using the molecular weight of the phosphoric ester, sulfonic acid or carboxylic acid.

As specific examples of such compound, there may be mentioned 2-ethylhexyl acid phosphate, mono- or di-isodecyl acid phosphate, mono- or di-tridecyl acid phosphate, mono- or di-lauryl acid phosphate, mono- or di-nonylphenyl acid phosphate. In cases where the water-borne base coating composition for automobiles according to the invention contains such compound, the content of the compound is preferably 0.1 to 5% by mass, more preferably 0.2 to 2% by mass, relative to the coating resin solids. When the above content is less than 0.1% by mass, the adhesion may decrease and, when it exceeds 5% by mass, the water resistance may possibly decrease.

The water-borne base coating composition for automobiles according to the invention may further contain a polyether polyol. Said polyether polyol preferably has, on an average, not less than 0.02, more preferably not less than 0.04, still more preferably not less than 1, primary hydroxyl group per molecule. When the primary hydroxyl group content is less than 0.02, the performance characteristics of the coating film obtained will be deteriorated. The polyether polyol may have a secondary and/or tertiary hydroxyl group(s) in addition to the primary hydroxyl group and, from the viewpoint of performance characteristics of the resulting coating film, the total number of hydroxyl groups per molecule inclusive of those is preferably not less than 2. The above polyether polyol preferably has a hydroxyl value of 30 to 700, more preferably 50 to 500. When the hydroxyl value is outside the above range, the storage stability of the coating may decrease and/or the performance characteristics of the resulting coating film may possibly be deteriorated.

The above polyether polyol preferably has a number average molecular weight of 300 to 3,000, more preferably 400 to 2,000. When the number average molecular weight is outside the above range, the performance characteristics of the resulting coating film will be deteriorated. The above-mentioned number average molecular weight can be determined by GPC (gel permeation chromatography) on the polystyrene standard basis.

Furthermore, the above polyether polyol preferably has a water tolerance value of not less than 2.0, more preferably not less than 3.0. When the water tolerance value is less than 2.0, the stability of the coating will decrease and the coating film obtained will have a deteriorated appearance. The water tolerance value serves to evaluate the degree of hydrophilicity; a higher value means a higher degree of hydrophilicity.

The method of measuring the water tolerance value comprises dispersing, with stirring, 0.5 g of the polyether polyol in 10 ml of acetone placed in a 100-ml beaker at 25°

C., adding gradually deionized water to the mixture using a burette, and measuring the amount (ml) of deionized water required for this mixture to become turbid. This deionized water amount (ml) is recorded as the water tolerance value.

When a hydrophobic polyether polyol, for instance, is tested by this method, the initially well compatible state of the polyether polyol and acetone turns into an incompatible state upon addition of a small amount of deionized water, with the result that the measurement system becomes turbid. Conversely, when the polyether polyol is hydrophilic, the amount of deionized water required to cause turbidity increases as the hydrophilicity of the polyether polyol increases. Thus, this method can determine the degree of hydrophilicity/hydrophobicity of the polyether polyol.

In cases where the water-borne base coating composition for automobiles according to the invention contains such a polyether polyol as mentioned above, the content thereof is preferably 1 to 40% by mass, more preferably 3 to 30% by mass. When the content is less than 1% by mass, the coating film obtained will have a deteriorated appearance and, when it exceeds 40% by mass, the performance characteristics of the coating film obtained may possibly become deteriorated.

As such polyether polyol, there may be mentioned compounds resulting from addition of an alkylene oxide to an active hydrogen atom-containing compound in the conventional manner, generally in the presence of an alkali catalyst at ordinary pressure or under pressure at a temperature of 60 to 160° C. The active hydrogen atom-containing compound includes, among others, water; polyhydric alcohol components such as 1,6-hexanediol and neopentyl glycol, and tetrahydric alcohols such as diglycerol and sorbitan; pentahydric alcohols such as adonitol, arabitol, xylitol and triglycerol; hexahydric alcohols such as dipentaerythritol, sorbitol, mannitol, iditol, inositol, dulcitol, talose and allose; octahydric alcohols such as sucrose; such polyhydric alcohols as polyglycerol; such polyhydric phenols as pyrogallol, hydroquinone and phloroglucinol and such polyhydric phenols as bisphenol A, bisphenol sulfone and other bisphenols; polybasic carboxylic acid components such as adipic acid and fumaric acid; and mixtures of two or more of these.

The above-mentioned alkylene oxide specifically includes ethylene oxide, propylene oxide, butylene oxide and so forth. Two or more of these alkylene oxides may be used in combination. When two or more are used combinedly, the mode of addition may be either blockwise or random.

Commercially available among such polyether polyols are, for example, Primepol PX-1000, Sannix SP-750 and Sannix PP-400 (all trademarks, products of Sanyo Chemical Industries), and PTMG-650 (trademark, product of Mitsubishi Chemical).

Furthermore, for improving the pigment dispersibility, the above polyether polyol may be modified using, as a modifier, a basic substance such as an amino resin to be mentioned later herein, hydroxyethylethylenimine (e.g. "HEA", product of Sogo Pharmaceutical) or 2-hydroxypropyl-2-aziridinylethylcarboxylate (e.g. "HPAC", product of Sogo Pharmaceutical).

The content of the above modifier is preferably within the range of 1 to 10% by mass relative to the solid matter of the polyether polyol. When the content of the modifier is less than 1% by mass, the modification effect will be unsatisfactory and, when it exceeds 10% by mass, the stability of the modified polyether polyol may possibly become poor.

The water-borne base coating composition for automobiles according to the invention may also contain other coating film-forming resins as necessary. Such are not particularly restricted, but acrylic resins, polyester resins, alkyd resins, epoxy resins, urethane resins and like coating film-forming resins can be utilized.

The above-mentioned other coating film-forming resin preferably has a number average molecular weight of 1000 to 100000, more preferably 1500 to 30,000. When the above-mentioned number average molecular weight is less than 1000, the workability in the step of coating and the curability will be insufficient and, when it exceeds 100000, the unvolatile matter content in the step of application becomes too low; hence the workability in the step of coating may conversely decrease.

The other coating film-forming resin preferably has an acid group, and the resin solid acid value is preferably 10 to 100, more preferably 20 to 80. When the acid value is less than 10, the dispersibility of the resin in water will decrease and, when it is above 100, the performance characteristics of the coating film obtained may possibly be deteriorated.

The other coating film-forming resin preferably has a hydroxyl group, and the hydroxyl value is preferably 20 to 180, more preferably 30 to 160. When the hydroxyl value is less than 20, the curability of the resulting coating film may decrease and, when it exceeds 180, the performance characteristics of the coating film obtained may possibly become poor.

In cases where the water-borne base coating composition for automobiles according to the invention contains such other coating film-forming resin, the content thereof based on the coating solids is preferably 95 to 5% by mass, more preferably 90 to 15% by mass, still more preferably 80 to 30% by mass.

The water-borne base coating composition for automobiles according to the invention may further contain a curing agent. The curing agent includes those generally used in coatings, specifically amino resins, blocked isocyanates, epoxy compounds, aziridine compounds, carbodiimide compounds, oxazoline compounds, metal ions, etc. From the viewpoint of performance characteristics of resulting coating film and of cost, amino resins and/or blocked isocyanates are preferred.

The above-mentioned amino resins as curing agents are not particularly restricted. Thus, water-soluble melamine resins or water-insoluble melamine resins may be used. Among the melamine resins, those showing a water tolerance value of not less than 3.0 are preferably used from the coating stability viewpoint. The water tolerance value can be measured in the same manner as mentioned hereinbefore referring to the polyether polyol.

The above-mentioned blocked isocyanates include those which can be obtained by allowing a blocking agent having an active hydrogen atom to add to polyisocyanates such as trimethylene diisocyanate, hexamethylene diisocyanate, xylylene diisocyanate, isophoronediisocyanate and the like and which, upon heating, allow the blocking agent to be dissociated to generate an isocyanato group, which reacts with a functional group in the above-mentioned resin component to cause curing.

In cases where the water-borne base coating composition for automobiles according to the invention contains such a curing agent, the content thereof is preferably 20 to 100 parts by mass per 100 parts by mass of the coating resin solids from the curability viewpoint.

In the water-borne base coating composition for automobiles according to the invention, there may be incorporated, in addition to the above-mentioned components, one or more of other additives generally used in coatings, for example surface modifiers, thickening agents, antioxidants, ultraviolet absorbers, antifoaming agents and so forth. The levels of addition of these are within the ranges well known to those skilled in the art.

The method of preparing the water-borne base coating composition for automobiles according to the invention is not particularly restricted but may be any of all the methods well known to those skilled in the art, for example the method comprising kneading the compounding components such as pigments using a kneader or roll, or dispersing such components using a sand grinding mill or disper homogenizer.

The water-borne base coating composition for automobiles according to the invention is generally used for application and coating film formation, to an article to be coated by any method well known o those skilled in the art. As the method of application, there may be mentioned, for example, air spraying, airless spraying, and electrostatic coating. The thickness of the resulting coating film may vary according to the intended use but, generally, the dry film thickness is preferably 5 to 30 µm.

The coating film obtained may be heated for curing. Upon curing by heating, the physical properties and performance characteristics of the coating film can be improved. The heating temperature can appropriately be selected according to the species of the water-borne base coating composition of the invention. Generally, it is preferably selected within the range of 80 to 180° C. The heating time can be arbitrarily selected according to the heating temperature.

Method of Forming Double- or Multilayer Coatings

The method of forming a multilayer coating film according to the invention comprises applying the above-mentioned water-borne base coating composition for automobiles to an article to be coated, further applying a clear coating thereonto, and curing the resulting coating film by heating to form a multilayer coating film. The clear coating is not particularly restricted and it may be any of the clear coatings comprising a coating film-forming resin, a curing agent and so forth. It may further contain a coloring component provided that it will not impair the design of the basecoat. This clear coating may be in the form of a solvent-borne, water-borne, or powder composition.

As examples of the above solvent-borne clear coating which are preferred from the transparency or acid etching resistance viewpoint, there may be mentioned, among others, the combination of an acrylic resin and/or polyester resin and an amino resin and/or isocyanate, and an acrylic resin and/or polyester resin having a carboxylic acid/epoxy curing system.

As an example of the above-mentioned water-borne clear coating, there may be mentioned a coating comprising a resin derived from a coating film-forming resin to be contained in the above-mentioned solvent-borne clear coating by neutralization with a base for solubilization of the same in water. This neutralization can be effected by addition of a tertiary amine, such as dimethylethanolamine or triethylamine, before or after polymerization.

On the other hand, the powder clear coating can be an ordinary powder coating, such as a thermoplastic or thermosetting powder coating. However a thermosetting powder coating is preferred, since it can give a coating film having good physical properties. Specific examples of the thermosetting powder coating are epoxy type, acrylic type and polyester type powder clear coatings. Among them, acrylic type powder clear coatings, which provide good weathering resistance, are preferred.

Furthermore, for securing good workability in the step of application, a viscosity modifier is preferably incorporated into the above clear coating. Generally, the viscosity modifier may be one showing thixotropy. Usable as such are, for example, those known in the art and, further, those acrylic polymer compounds mentioned hereinabove referring to the water-borne base coating composition. Where necessary, the composition may contain a curing catalyst, a surface modifier, etc.

An article to be coated by the method of forming a multilayer coating film according to the invention includes various substrates, for example metal moldings, plastics moldings, foamed articles, and so forth. Preferably, the method is applied to metal moldings capable of being coated by cationic electrodeposition coating.

As the above metal moldings, there may be mentioned, among others, plates and other moldings made of iron, copper, aluminum, tin, zinc or a like metal or an alloy containing such metals, specifically bodies and parts of automobiles such as passenger cars, trucks, motorcycles and buses. Preferably, these metal moldings are subjected in advance to chemical conversion treatment with a phosphate, a chromate or the like.

The above metal moldings treated for chemical conversion may have an electrodeposited coating film formed thereon. For forming such coating film, a cationic or anionic type electrodeposition coating may be used. From the corrosion resistance viewpoint, however, a cationic electrodeposition coating composition is preferred.

As the above-mentioned plastics moldings, there may be mentioned plates and other moldings made of polypropylene resins, polycarbonate resins, urethane resins, polyester resins, polystyrene resins, ABS resins, vinyl chloride resins, polyamide resins, etc., specifically such automotive parts as spoilers, bumpers, mirror covers, grills, and door knobs, among others. Preferably, these plastics moldings are washed in advance with a trichloroethane vapor or with a neutral detergent. They may have been subjected to primer coating for enabling electrostatic coating.

Furthermore, the article to be coated may have an intermediate coating film formed thereon according to need. For intermediate coating film formation, an intermediate coating is used. This intermediate coating contains a coating film-forming resin(s), a curing agent(s), one or more of various organic or inorganic coloring components, and an extender pigment(s), among others. The coating film-forming resin and curing agent each is not particularly restricted but specifically include those coating film-forming resins and curing agents mentioned hereinabove referring to the water-borne base coating composition for automobiles. The resin and curing agent are used combinedly. From the viewpoint of the performance characteristics and cost of the resulting intermediate coat, an acrylic resin and/or polyester resin and an amino resin and/or isocyanate are used in combination.

As the coloring component to be contained in the above intermediate coating, mention may be made of those mentioned hereinabove referring to the water-borne base coating composition. Generally, use is preferably made of gray intermediate coatings mainly containing carbon black and titanium dioxide, and the so-called colored intermediate coatings having a set gray color matched to the hue of the top coat or containing an appropriate combination of various coloring components. Moreover, flat pigments such as aluminum powder, mica powder, etc. may also be added.

In these intermediate coatings, there may be incorporated, in addition to the components mentioned above, one or more of additives conventionally used in coatings, for example surface modifiers, antioxidants, and antifoaming agents.

From the improved appearance viewpoint, the above water-borne base coating composition for automobiles is applied to the article to be coated by such a coating method as multistage, preferably two-stage, coating by air electrostatic spray coating, or a combination of air electrostatic spray coating with the use of an electrostatic coating machine of the rotary atomizer type, which is called a metallic bell.

The thickness of the coatings resulting from application of the above water-borne base coating composition for automobiles may vary according to the intended use but, generally, the dry film thickness is preferably 5 to 30 µm. When the above dry film thickness is less than 5 µm, the under coat cannot be hidden or the film may be broken and, when it exceeds 30 µm, the image sharpness may decrease or such a trouble as mottling or sagging may possible occur in the step of application.

In practicing the method of forming a multilayer coating film according to the invention, the base coating film obtained by application of the water-borne base coating may be baked, followed by application of the clear coating thereto. It is also possible, and preferred from the economic and environmental viewpoint, to apply the clear coating further onto the base coating film in the uncured state to form a clear coating film, hence the step of baking/drying the base coating film can be omitted thereby. For obtaining coating films with a better finish, it is desirable that the uncured base coating film be heated at 40 to 100° C. for 2 to 10 minutes prior to application of the clear coating.

In the method of forming a coating film according to the invention, the clear coating film applied after formation of the base coating film serves to smoothen the unevenness or twinkling or the like due to the base coating film and protect the base coating film and further add to the beauty thereof. A specific method of applying the clear coating to the base coating film comprises using a rotary atomizer type electrostatic coater called "Micro micro bell" or "Micro bell".

The dry film thickness of the clear coat formed by application of the above clear coating film is generally and preferably about 10 to 80 µm, more preferably about 20 to 60 µm. When the dry film thickness is less than 10 µm, the irregularities of the ground cannot be hidden and, when it exceeds 80 µm, such a trouble as popping or sagging may possibly occur in the step of application.

In curing the thus-formed clear coating film, the so-called two-coat one-bake technique is preferably used which comprises heating the clear coating film, together with the uncured base coating film, for curing, as mentioned hereinabove.

The temperature for the above heating for curing is preferably selected within the range of 80 to 180° C., more preferably within the range of 120 to 160° C., from the viewpoint of the curability and the physical properties of the multilayer coating film obtained. The time of heating for curing can be selected arbitrarily according to the above temperature. When the heating/curing temperature is 120° C. to 160° C., the time is appropriately 10 to 30 minutes.

The thus-obtained multilayer coating film generally has a thickness of 30 to 300 µm, preferably 50 to 250 µm. When the film thickness is less than 30 µm, the strength of the coatings themselves will be low and, when it exceeds 300 µm, the film physical characteristics, such as heat cycle resistance, may possibly decrease.

The coated article of the invention has, on the surface thereof, a multilayer coating film formed by the above-mentioned method of forming a multilayer coating film and is of very high quality in both luster and coloration.

The water-borne base coating composition for automobiles according to the invention contains an acrylic polymer compound having a specific structure within a specified content range and, therefore, can give a coating film enhanced in luster and coloration without lowering the workability in the step of application. The reasons are not certain but the above-mentioned acrylic polymer compound presumably produces some effect in causing the optically coherent flaky pigment to orient in a regular manner in the process of heating for curing following the step of application.

EXAMPLES

The following examples illustrate the present invention more specifically. These examples are, however, by no means limitative of the scope of the invention. In the examples, "part(s)" means "part(s) by mass", unless otherwise specified.

Production Example 1

Production of Water-dispersible Resin A

To a reaction vessel charged with 194.1 parts of deionized water were added 0.2 part of Adeka Reasoap NE-20 (product of Asahi Denka Kogyo; α-{1-[(allyloxy)methyl]-2-(nonylphenoxy)ethyl}-ω-hydroxyoxyethylene, aqueous solution, solid matter content 80% by mass) and 0.2 part of Aqualon HS-10 (trademark, product of Dai-ichi Kogyo Seiyaku, polyoxyethylene alkylpropenylphenyl ether sulfate ester). The temperature was raised to 80° C. with stirring under a nitrogen stream. Then, a monomer mixture (as the first step α,β-ethylenically unsaturated monomer mixture) composed of 18.5 parts of methyl acrylate, 31.7 parts of ethyl acrylate, 5.8 parts of 2-hydroxyethyl acrylate, 10.0 parts of styrene, 4.0 parts of acrylamide, 0.3 part of Adeka Reasoap NE-20, 0.2 part of Aqualon HS-10 and 70 parts of deionized water, and an initiator solution composed of 0.2 part of ammonium persulfate and 7 parts of deionized water were added dropwise in parallel to the reaction vessel over 2 hours. After completion of the dropping, maturation was carried out at the same temperature for 1 hour.

Further, a monomer mixture (as the second step α,β-ethylenically unsaturated monomer mixture) composed of 24.5 parts of ethyl acrylate, 2.5 parts of 2-hydroxyethyl acrylate, 3.1 parts of methacrylic acid, 0.3 part of Aqualon HS-10 and 30 parts of deionized water, and an initiator solution composed of 0.1 part of ammonium persulfate and 3 parts of deionized water were added dropwise in parallel to the reaction vessel at 80° C. over 0.5 hour. After completion of the dropping, maturation was effected at the same temperature for 2 hours. Then, the mixture was cooled to 40° C. and then filtered through a 400-mesh filter. Further, the pH was adjusted to 7 by addition of a 10% (by mass) aqueous solution of dimethylaminoethanol. A water-dispersible resin A with a mean particle diameter of 110 nm, a nonvolatile matter content of 24%, a solid matter acid value of 20, a hydroxyl value of 40 and a Tg of 0° C. was thus obtained.

Production Example 2

Production of Water-soluble Resin B

A reaction vessel was charged with 23.9 parts of dipropylene glycol methyl ether and 16.1 parts of propylene glycol methyl ether, and the mixture was heated to 120° C. with stirring under a nitrogen stream. Then, a mixed solution composed of 54.5 parts of ethyl acrylate, 12.5 parts of methyl methacrylate, 14.7 parts of 2-hydroxyethyl acrylate, 10.0 parts of styrene and 8.5 parts of methacrylic acid, and an initiator solution composed of 10.0 parts of dipropylene glycol methyl ether and 2.0 parts of tert-butyl peroxy-2-ethylhexanoate were added dropwise in parallel to the reaction vessel over 3 hours. After completion of the dropping, maturation was carried out at the same temperature for 0.5 hour.

Further, an initiator solution composed of 5.0 parts of dipropylene glycol methyl ether and 0.3 part of tert-butyl peroxy-2-ethylhexanoate was added dropwise to the reaction vessel over 0.5 hour. After completion of the dropping, maturation was effected at the same temperature for 1 hour. Then, 16.1 parts of the solvent was distilled off under reduced pressure (70 Torr) at 110° C. using a solvent removing apparatus and, then, 187.2 parts of deionized water and 8.8 parts of dimethylaminoethanol were added to give a water-soluble resin B with a nonvolatile matter content of 31%, a number average molecular weight of 27,000, a solid matter acid value of 56, a hydroxyl value of 70 and a viscosity of 15,000 mPa·s (measuring apparatus: Toki Sangyo R series 500, conical rotational viscometer; measurement conditions: 1.34-degree cone, 1 rpm/25° C.).

Production Example 3

Production of Phosphoric Acid Group-containing Acrylic Resin C

A reaction vessel was charged with 23 parts of methoxypropanol, and the charge was heated to 120° C. with stirring under a nitrogen stream. Then, a solution (22 parts) composed of 15 parts Phosmer PP (trademark, product of Uni-Chemical, acid phosphoxyhexa(oxypropylene) monomethacrylate) in 7 parts of methoxypropanol, a mixed solution composed of 12.3 parts of 2-ethylhexyl acrylate, 7.0 parts of 2-hydroxyethyl methacrylate, 7.5 parts of lauryl methacrylate, 4.4 parts of styrene and 3.8 parts of methacrylic acid, and an initiator solution composed of 4.5 parts of methoxypropanol and 0.9 part of azobisisobutyronitrile were added dropwise in parallel to the reaction vessel over 3 hours. After completion of the dropping, maturation was effected at the same temperature for 0.5 hour.

Further, an initiator solution composed of 0.5 part of methoxypropanol and 0.5 part of azobisisobutyronitrile was added dropwise to the reaction vessel over 0.5 hour. After completion of the dropping, maturation was effected at the same temperature for 1.5 hours. Then, 13.7 parts of methoxypropanol was added to give a phosphoric acid group-containing acrylic resin C with a nonvolatile matter content of 50%, a solid matter acid value of 61, a hydroxyl value of 60 and a number average molecular weight of 5,000.

Production Example 4

Production of Color Pigment Paste D-1

The water-soluble resin B (69.2 parts), 29.5 parts of deionized water and 5.2 parts of Degussa Carbon FW-285 (trademark, product of Degussa AG) were preliminarily mixed together and then, in a paint conditioner, admixed with glass beads, and the whole mixture was stirred at room temperature for 1 hour to attain dispersion to give a color pigment paste (D-1) with a particle diameter of not more than 5 µm.

Production Example 5

Production of Color Pigment Paste D-2

A color pigment paste (D-2) with a particle diameter of not more than 5 µm was prepared in the same manner as in Production Example 4 except that 54.5 parts of the water-soluble resin B, 22.9 parts of deionized water and 16.5 parts of Cyanine Blue G-314 (trademark, product of Sanyo Color Works) were used.

Production Example 6

Production of Color Pigment Paste D-3

A color pigment paste (D-3) with a particle diameter of not more than 5 µm was prepared in the same manner as in Production Example 4 except that 69.2 parts of the water-soluble resin B, 22.8 parts of deionized water and 9.8 parts of Cinquacia Magenta BRT-343D (trademark, product of Ciba Specialty Chemicals) were used.

Production Example 7

Production of Color Pigment Paste D-4

A color pigment paste (D-4) with a particle diameter of not more than 5 µm was prepared in the same manner as in Production Example 4 except that 55.6 parts of the water-soluble resin B, 38.9 parts of deionized water and 16.7 parts of Perrindo Maroon R-6436 (trademark, product of Bayer) were used.

Example 1

Water-borne Base Coating Composition 1 for Automobiles

The water-dispersible resin A (160.0 parts), 71.6 parts of the water-soluble resin B, 4.00 parts of the phosphoric acid group-containing acrylic resin C, 24.1 parts of the color pigment paste D-1, 21.6 parts of the color pigment paste D-2, 30.0 parts of 2-ethylhexyl glycol, 10.0 parts of Primepol PX-1000 (trademark, product of Sanyo Chemical Industries), 37.5 parts of Cymel 204 (trademark, methyl/butyl mixed alkylated melamine resin curing agent, product of Mitsui Cytec, solid matter content 80% by mass) and 19.5 parts of Iriodin 7225W2 (trademark, coherent mica pigment with a mean particle diameter of 18 µm, product of Merck) were mixed up in a disper homogenizer and, then, 4.00 parts of SN Thickener N-1 (trademark, product of SanNopco, acrylic compound polymer; when SN Thickener N-1 is represented by the general formula (1) given hereinabove, A and B are the same or different and each represents a molecular terminal group resulting from radical polymerization, a terminal group resulting from hydrolysis thereof, a hydrogen atom or a hydroxyl group, M is a carboxylic acid group, N is a carboxylic acid group, a carboxylic acid ester group whose ester moiety contains not less than 1 carbon atoms, or a carboxylic acid group neutralized with ammonia or a primary, secondary or tertiary amine compound, R is a hydrogen atom or a methyl group and m/n=95, effective component 25% by mass) was added, followed by further stirring, whereby a uniformly dispersed water-borne base coating composition 1 for automobiles was obtained. Further, this composition was diluted with deionized water to a viscosity of 45 seconds (measured at 20° C. using a No. 4 Ford cup).

An article to be coated, namely a zinc phosphate-treated dull steel panel (300×400×0.8 mm), was electrodeposition-coated with Power Top U-50 (trademark, product of Nippon Paint, cationic electrodeposition coating) to a dry film thickness of 20 μm, followed by 30 minutes of heating at 160° C. for curing. The thus-coated plate was air-spray coated, in two stages, with Orga P-2 (trademark, product of Nippon Paint, melamine-curable polyester resin-based gray intermediate coating), diluted in advance to a viscosity of 25 seconds (measured at 20° C. using a No. 4 Ford cup), to a dry film thickness of 35 μm, followed by 30 minutes of heating at 140° C. for curing. Then, the plate was cooled to give an immediate-coated substrate.

The water-borne base coating composition 1 for automobiles was applied, in two stages at room temperature (25° C.) and 85% humidity, to the electrodeposition-coated substrate obtained in the above manner to a dry film thickness of 15 μm using a Metallic Bell COPES-IV coater (trademark, product of ABB Industries, rotary atomizer type electrostatic coater for water-borne coating). Interval setting was allowed to proceed for 1.5 minutes between the two coating procedures. After the second application, setting was allowed to proceed for 5 minutes. Thereafter, the whole was preheated at 80° C. for 3 minutes.

After preheating, the coated plate was allowed to cool to room temperature and then coated, in one stage, with the clear coating Orga TO-563 Clear (trademark, product of Nippon Paint, melamine-curable acrylic resin-based clear coating) to a dry film thickness of 40 μm using a Micro Micro Bell (trademark, product of ABB Ransburg, rotary atomizer type electrostatic coater), followed by 7 minutes of setting. Further, the coated plate obtained was heated, for curing, at 140° C. for 30 minutes in a hot air drying oven. A multilayer coating film was thus obtained on the article.

Examples 2 and 3 and Comparative Examples 1 to 4

According to the formulations given in Table 1, water-borne base coating compositions 2 to 7 for automobiles were prepared and applied in the same manner as in Example 1 to give multilayer coating films on respective articles.

Evaluation Tests (1) Solid Matter Content Measurement in the Step of Application Two grams of each diluted, water-borne base coating composition for automobiles was weighed and dried at 150° C. for 30 minutes, and the solid matter content was determined. When the solid matter content was 20 to 30% by mass, the composition was regarded as being acceptable. The results thus obtained are shown in Table 2.

(2) Luster and Coloration

The multilayer coating films obtained were measured for L, a and b values using a MINOLTA CR-300 (trademark, colorimeter). The results thus obtained are shown in Table 2.

TABLE 1

|  | Example | | | Comparative Example | | | |
| --- | --- | --- | --- | --- | --- | --- | --- |
|  | 1 | 2 | 3 | 1 | 2 | 3 | 4 |
| Water-borne base coating composition | 1 | 2 | 3 | 4 | 5 | 6 | 7 |
| Water-dispersible resin A | 160.0 | 160.0 | 160.0 | 160.0 | 160.0 | 160.0 | 160.0 |
| Water-soluble resin B | 71.6 | 22.4 | 32.9 | 71.6 | 71.6 | 22.4 | 32.9 |
| Phosphoric acid group-containing acrylic resin C | 4.00 | 4.00 | 4.00 | 4.00 | 4.00 | 4.00 | 4.00 |
| Color pigment paste | | | | | | | |
| D-1 | 24.1 | 40.3 | — | 24.1 | 24.1 | 40.3 | — |
| D-2 | 21.6 | 5.76 | — | 21.6 | 21.6 | 5.76 | — |
| D-3 | — | 80.5 | — | — | — | 80.5 | — |
| D-4 | — | — | 29.8 | — | — | — | 29.8 |
| D-5 | — | — | 72.4 | — | — | — | 72.4 |
| 2EHG[1)] | 30.0 | 30.0 | 30.0 | 30.0 | 30.0 | 30.0 | 30.0 |
| PX-1000[2)] | 10.0 | 10.0 | 10.0 | 10.0 | 10.0 | 10.0 | 10.0 |
| Cymel 204[3)] | 37.5 | 37.5 | 37.5 | 37.5 | 37.5 | 37.5 | 37.5 |
| Iriodin 7225W2[4)] | 19.5 | — | — | 19.5 | 19.5 | — | — |
| Iriodin 7235W2[5)] | — | 14.0 | — | — | — | 14.0 | — |
| EX Marine Russet[6] | — | — | 9.06 | — | — | — | 9.06 |

TABLE 1-continued

|  | Example | | | Comparative Example | | | |
|---|---|---|---|---|---|---|---|
|  | 1 | 2 | 3 | 1 | 2 | 3 | 4 |
| EX Marine F Russet[7] | — | — | 15.2 | — | — | — | 15.2 |
| SN Thickener N-1[8] | 4.00 | 4.00 | 4.00 | — | 20.0 | — | — |

[1] 2-Ethylhexyl glycol
[2] Primepol PX-1000 (polyether polyol, product of Sanyo Chemical Industries)
[3] Methyl/butyl mixed alkylated melamine resin curing agent, product of Mitsui Cytec, solid matter content 80% by mass
[4] Coherent mica pigment with a mean particle diameter of 18 μm, product of Merck
[5] Coherent mica pigment with a mean particle diameter of 18 μm, product of Merck
[6] Coherent mica pigment with a mean particle diameter of 18 μm, product of Engelhard
[7] Coherent mica pigment with a mean particle diameter of 10 μm, product of Engelhard
[8] SN Thickener N-1 (San-Nopco's acrylic polymer compound; A and B are the same of different and each represents a molecular terminal group resulting from radical polymerization, a terminal group resulting from hydrolysis thereof, a hydrogen atom or a hydroxyl group, M is a carboxylic acid group, N is a carboxylic acid group, a carboxylic acid ester group whose ester moiety contains not less than 1 carbon atoms, or a carboxylic acid group neutralized with ammonia or a primary, secondary ortertiary amine compound, R is a hydrogen atom or a methyl group and m/n = 95, effective component 25% by mass)

TABLE 2

|  | Example | | | Comparative Example | | | |
|---|---|---|---|---|---|---|---|
|  | 1 | 2 | 3 | 1 | 2 | 3 | 4 |
| Water-borne base coating composition | 1 | 2 | 3 | 4 | 5 | 6 | 7 |
| Coating solid matter content in the step of application*) | 20.5 | 24.1 | 22.9 | 22.8 | 16.2 | 26.9 | 25.1 |
| Luster   L value | 25.51 | 25.60 | 27.25 | 24.99 | 25.79 | 25.17 | 27.09 |
| Coloration   a value | 1.23 | −10.92 | 26.78 | 0.95 | 1.25 | −10.18 | 26.20 |
|   b value | −21.41 | 1.21 | 10.55 | −20.24 | −22.01 | 1.36 | 10.27 |

*) Unit: % by mass

As is evident from the results shown in Table 2, the water-borne base coating compositions 1 to 3 for automobiles, which contained the acrylic polymer compound of general formula (1) within the specified content range, had a solid matter content of 20 to 30% by mass in the step of application and caused no workability trouble in applying them (Examples 1 to 3). However, as regards the water-borne base coating composition 5 for automobiles, in which the above content was above the specified range, the solid matter content in the step of application was less than 20% by mass and the workability in the step of application decreased (Comparative Example 2). The water-borne base coating compositions 1 to 3, which contained the acrylic polymer compound of general formula (1) within the specified content range, each showed a high L value as compared with the water-borne base coating compositions 4, 6 and 7 of the same coat color (Examples 1 to 3 and Comparative Examples 1, 3 and 4).

Further, in the same manner, the water-borne base coating composition 1 for automobiles was lower in b value than the water-borne base coating composition 4 for automobiles, the water-borne base coating composition 2 for automobiles was lower in a value than the water-borne base coating composition 6 for automobiles, and the water-borne base coating composition 3 for automobiles was higher in a value than the water-borne base coating composition 7 for automobiles. The above results indicate that the whiteness of the coating film was enhanced, the luster increased, and the expression of each color improved when the compositions of the invention were applied.

The invention claimed is:

1. A water-borne base coating composition for automobiles comprising
an emulsion resin obtained by emulsion polymerization of an α,β-ethylenically unsaturated monomer mixture having an acid value of 3 to 50 and comprising at least 65% by mass of a (meth)acrylate ester whose ester moiety contains one or two carbon atoms, a coloring component comprising an optically coherent flaky pigment, and an acrylic polymer compound having a weight average molecular weight of 400,000 to 1,500,000 and represented by the general formula (1):

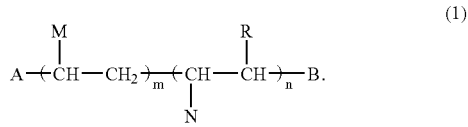

in the formula, A and B are the same or different and each represents a molecular terminal group resulting from radical polymerization, a terminal group resulting from hydrolysis thereof, a hydrogen atom or a hydroxyl group; M represents a carboxylic acid group or a carboxylic acid group neutralized with ammonia or a primary, secondary or tertiary amine compound, N represents a carboxylic acid group, a carboxylic acid ester group whose ester moiety contains one or more carbon atoms, or a carboxylic acid group neutralized with ammonia or a primary, secondary or tertiary amine compound; m is an integer of not less than 1 and n is an integer of not less than 0, provided that m/9 is not less than n; and R is a hydrogen atom or a methyl group, the content of said acrylic polymer compound on the solid basis being 0.3 to 4.0% by mass relative to the resin solids in the coating composition.

2. The water-borne base coating composition for automobiles according to claim 1, which comprises a polyether polyol having, on an average, not less than 0.02 primary hydroxyl group per molecule, and having a number average molecular weight of 300 to 3,000 and a water tolerance value of not less than 2.0.

3. The water-borne base coating composition for automobiles according to claim 2, wherein the polyether polyol has not less than one primary hydroxyl group per molecule and a hydroxyl value of 30 to 700.

* * * * *